United States Patent [19]

Akiba et al.

[11] Patent Number: 4,604,618

[45] Date of Patent: Aug. 5, 1986

[54] TIME-DIVISION MULTIPLEX TRANSMISSION SYSTEM

[75] Inventors: Osamu Akiba, Neyagawa; Yoshiharu Suzuki, Kadoma; Motoharu Terada, Higashiosaka; Takashi Saeki, Shijonawate, all of Japan

[73] Assignee: Matsushita Electric Works, Ltd., Kadoma, Japan

[21] Appl. No.: 489,324

[22] Filed: Apr. 28, 1983

[30] Foreign Application Priority Data

May 15, 1982 [JP] Japan .................................. 57-81842

[51] Int. Cl.⁴ ........................ G05B 23/02; H04Q 9/00
[52] U.S. Cl. .......................... 340/825.06; 340/825.07; 340/825.54
[58] Field of Search ...................... 340/825.04, 825.06, 340/825.07, 825.54, 825.6, 825.61, 825.08, 870.13; 370/80, 96, 90

[56] References Cited

U.S. PATENT DOCUMENTS 4,037,199  6/1977  Rozehnal et al. .............. 340/870.13
4,360,912 11/1982  Metz et al. .......................... 370/90
4,466,001  8/1984  Moore et al. .................... 340/825.08

Primary Examiner—Donald J. Yusko
Assistant Examiner—Sharon L. Hodgkins
Attorney, Agent, or Firm—Staas & Halsey

[57] ABSTRACT

In a time-division multiplex transmission system, a host machine (3) and a plurality of addressable terminals (51 to 56) are connected together by way of a signal line (6). The same address (A) is assigned to a group of the terminals (51 to 54) so that the group of terminals (51 to 54) may be placed under control at the same time upon receipt of a transmission signal (SS) from the host machine (3). Reply signals (RS1 to RS4) from the respective terminals (51 to 54) are adjusted so that they are sent back at different points in time. This enables the host machine (3) to determine which of the terminals sent back the reply signal (RS1 to RS4).

8 Claims, 17 Drawing Figures

FIG. 1

PRIOR ART

FIG. 3

PRIOR ART

TIME-DIVISION MULTIPLEX TRANSMISSION SYSTEM

BACKGROUND OF THE INVENTION

1. Field of the Invention

This invention relates to a time-division multiplex transmission system which includes a host machine, a plurality of addressable terminals and a signal line connecting the terminals to the host machine to place objects to be controlled, (connected to the terminal) under the centralized control of the host machine and objects to be monitored, (connected to the terminals) under the centralized monitoring of the host machine.

2. Description of the Related Art

Figure 1:
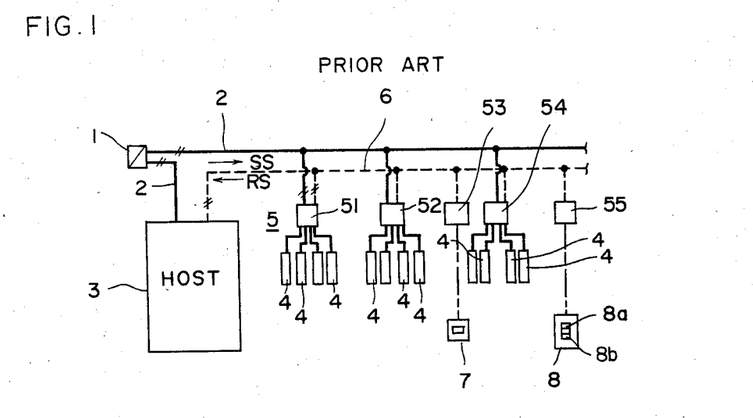
FIG. 1 is a block diagram of a conventional time-division multiplex transmission system.

FIG. 1 shows the scheme of a conventional time-division multiplex transmission system. A host machine 3 and plurality of addressable terminals 51 to 55 are connected together by way of a signal line 6. The host machine 3 and the terminals 51 to 55 are further connected by means of a commercial power line 2 leading from a distribution board 1. Connected to the respective terminals are objects to be controlled, (for example, loads 4) or objects to be monitored (for example, a sensor 7 and a wall switch 8). The host machine 3 and the loads 4 are enabled with the utility power from the commercial power line 2 as their enabling power. Enabling power is also made available to each of the terminals 51 to 55 by full-wave rectifying a transmission signal SS sent in the fashion of time-division multiplex transmission via the signal line 6 (which is of the two-wire type) from the host machine 3. The terminals 51 to 55 receive the transmission signal SS and control the loads 4. The sensor 7 may be a daylight sensor, a temperature sensor or a fire/burglary sensor. Monitor data from the sensor 7 are fed back to the host machine 3 as a reply signal RS via the terminal 53. The wall switch 8 comprises operation switches 8a and 8b. Electric representation of the operational states of the operation switches 8a and 8b is fed to the host machine 3 via the terminal 55.

Figure 2:
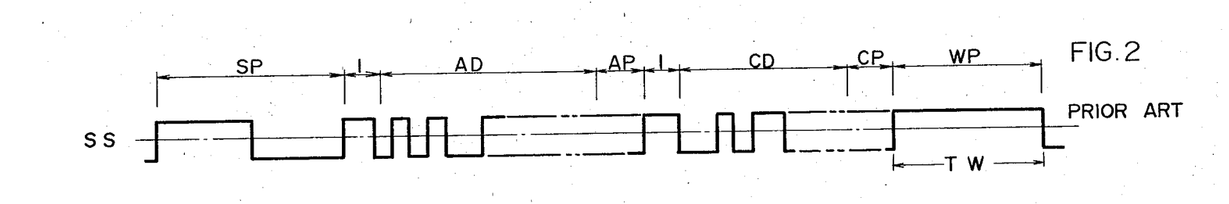
FIG. 2 is a graph of a transmission signal sent from a host machine to terminals.

FIG. 2 illustrates the transmission signal fed from the host machine 3 to the terminals. The transmission signal SS for each of the terminals consists of a serial sequence of a start pulse SP of a slightly broader width, a 1-bit pulse of a logic value "1", M-bit address data AD for selection of a desired one of the terminals, a 1-bit address data parity bit AP, a 1-bit pulse of a logic value "1", N-bit control data CD for controlling the object to be controlled in the selected one of the terminals, a 1-bit control data parity bit CP and a reply standby signal WP for receiving the reply signal from the terminal. It is noted that pulses of a broader width in the address data AD and control data CD denote a logic value "1" and those of a narrower one denote a logic value "0". A reply standby period TW during which the reply standby signal WP is under transmission, has a sufficient length. These signal components are transmitted for each address in a cyclic fashion as the transmission signal SS from the host machine 3.

Figure 3:
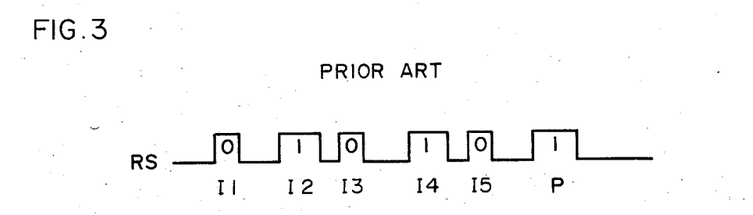
FIG. 3 is a graph of a reply signal sent from the terminal back to the host machine.

The terminals 51 to 55 read the control data CD from the transmission signal SS sent via the signal line 6 from the host machine 3 and control their associated loads 4. Furthermore, the terminals 51 to 55 send the reply signal RS back to the host machine in the current mode during the reply standby period TW of the transmission signal SS. FIG. 3 illustrates the reply signal RS fed from a terminal to the host machine 3. The reply signal RS is shown as including monitor data I1 to I5 from the objects to be monitored, such as the sensor and the like, and a parity bit P. As with the transmission signal SS, current pulses of a broader width in the reply signal RS denote the logic value "1" and those of a narrower one denote the logic value "0". Upon receipt of the reply signal R from any of the terminals 51 to 55, the host machine 3 keeps watch on the status of the objects to be monitored, such as the sensor and the like.

Assuming that the address data AD in the transmission signal SS is 8 bits long, the conventional time-division multiplex transmission system as discussed above has not more than 256 addresses available. This presents the problem that a total number of the terminals connectable to the single host machine 3 should not exceed 256. While under these circumstances an increase in the bit length of the address data AD may increase the total number of the terminals 5 connectable thereto, it presents another problem in that it takes a longer time for the host machine 3 to gain access to all of the terminals 5. Another possible approach is to divide the plurality of the terminals 5 into a plurality of groups and assign the same address to the terminals in the same group. This approach itself is however disadvantageous in that the host machine 3 cannot perform a reliable monitoring function because of timewise overlap of the reply signals from the different terminals. There is, therefore, still the demand for a time-division multiplex transmission system in which the reply signals from a plurality of terminals having the same address assigned thereto do not overlap in time with one another.

SUMMARY OF THE INVENTION

The present invention is directed to a time-division multiplex transmission system in which a host machine and a plurality of addressable terminals are connected together by way of a signal line to place objects to be controlled (connected to the terminal) under the centralized control of the host machine, and objects to be monitored (connected to the terminals) under the centralized monitoring of the host machine 3. The host machine is provided with transmission means for transmitting, for each address in the cyclic fashion, address data for addressing the terminals, control data for controlling the objects to be controlled and reply standby signals for receiving a reply signal from any of the terminals. It is noted that a reply standby period during which the reply standby signal is under transmission, is divided into a plurality of reply blocks. The host machine 3 is further provided with first reception means for receiving the reply signal from any of the terminals during the reply standby period and for picking up monitor data included therein. The terminals each include second reception means for receiving the signal transmitted from the host machine 3 and address setting means for setting an address assigned thereto. The same address is set for the terminals whose number is smaller than the number of the reply blocks. Furthermore, the terminals each include address decision means for determining if the address defined by the address data received agrees with the preset address; control signal output means for providing a control signal corresponding to the control data when there is agreement (as determined by the address decision means); reply means for receiving monitor data from the objects to be monitored, having a number which is smaller than that of the reply blocks, and for supplying for each preselected reply block the reply signal including the monitor data; and selection means for selecting some of the reply blocks where the reply signal is to be sent from the reply means.

According to the present invention, with the transmission signal fed from the host machine, a group of the terminals is accessed whose address setting is identical with the address data included in the transmission signal. The terminals in the selected group supply the control signals at the same time in response to the control data in the transmission signal, which control signals control the objects to be controlled. The monitor data from the objects to be mnitored, on the other hand, is fed to the respective terminals, which in turn send back the reply signals, including the monitor signals, during the reply standby period of the transmission signal. The selection means in the terminals selects the one of the reply blocks during which the reply signal is fed back. Because there is no overlap in the reply signals sent back from the terminals in the same group, the host machine can determine which of the terminals sent back the reply signal. Therefore, the host machine keeps better watch on the objects to be monitored.

Accordingly, a major object of the present invention is to provide a time-division multiplex transmission system in which there is no overlap of reply signals sent from a plurality of terminals having the same address assigned thereto.

A major advantage of the present invention lies in the fact that the host machine can perform accurate and reliable supervisory operation on the objects to be monitored (which are connected to the terminals), because there is no overlap of the reply signals from the plurality of the terminals having the same address assigned thereto.

Another advantage of the present invention is that the number of connectable terminals can be increased without the need for a longer time period to access all of the terminals, since the same address is assigned to a group of the terminals.

Still another advantage of the present invention is the ability to perform both a controlling operation and a monitoring operation when the group of terminals having the same address assigned thereto is addressed once.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 4:
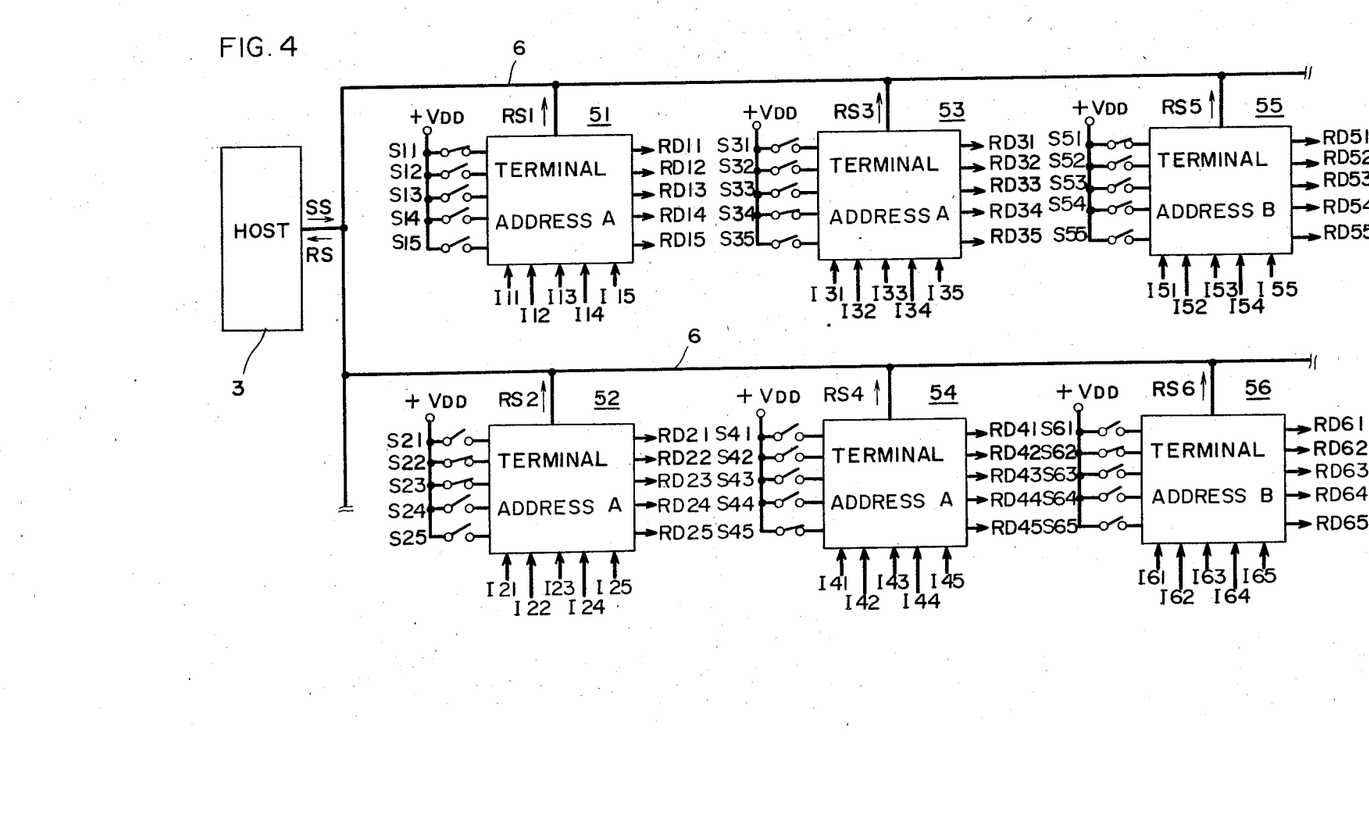
FIG. 4 is a block diagram of an embodiment of the present invention.

FIG. 4 is a block diagram of an embodiment of the present invention. A plurality of terminals 51 to 56 are connected to a host machine 3 by way of a signal line 6. Of the terminals 51 to 56, the terminals 51 to 54 are given the same address A. The remaining terminals 55 and 56 are given the same address B. The terminal 51 has selection switches S11 to S15 for selecting one of reply blocks at which its reply signal RS1 is to be fed. In response to a transmission signal SS from the host machine 3, the terminal 51 provides control signals RD11 to RD15 for one or more objects to be controlled. Furthermore, the terminal 51 is supplied with monitor data I11 to I15 from one or more objects to be monitored. The foregoing is the case with the remaining terminals 52 to 56. In this case different ones of reply blocks are selected in advance by means of the selection switches in the terminals 51 to 54 having the same address setting. In other words, the selection switch S11 is ON in the terminal 51; the selection switches S22 and S23 are ON in the terminal 52; the switch S34 is ON in the terminal 53; and the switch S45 is ON in the terminal 54. The other switches are all OFF. The operation of this embodiment will be set forth with reference to FIG. 5.

Figure 5:
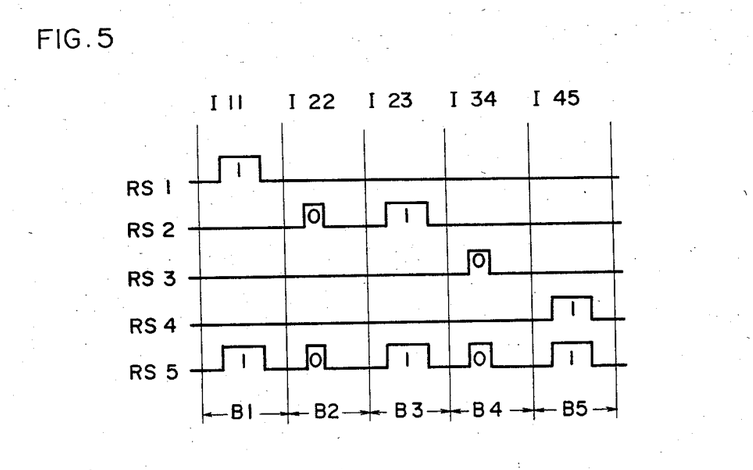
FIG. 5 is a time chart for describing reply signals sent from the terminals in FIG. 4.

FIG. 5 is a time chart describing reply signals from the terminals in FIG. 4. Should the selection switches S11 to S15 be all ON, the terminal 51 will send the reply signal RS1, including the monitor data I11 to I15, in sequence during the reply blocks B1 to B5, respectively. However, since only the selection switch S11 is ON in the terminal 51 as described previously, the signal to be sent from the terminal 51 is the reply signal RS1 which only includes the monitor data I11 bearing a logic value "1" during the reply block B1. The terminal 51 feeds no reply signal RS1 during the other reply blocks B2 to B5. Since only the selection switches S22 and S23 are ON in the terminal 52, the reply signal RS2 fed from the terminal 52 only includes the monitor data I22 bearing a logic value "0" during the reply block B2 and the monitor data I23 bearing the logic value "1" during the reply block B3. Furthermore, since only the selection switch S34 is ON in the terminal 53, the reply signal RS3 sent from the terminal 53 only includes the monitor data I34 of the logic value "0" during the reply block B4. Because only the selection switch S45 is on in the terminal 54, the terminal 54 sends the reply signal RS4 which only includes the monitor data I45 of the logic value "1", during the reply block B5. In other words, the monitor data sent back to the host machine 3 is dependent upon which of the selection switches is turned ON in the respective terminals. As noted earlier, in no circumstances will the reply signals from the terminals 51 to 54 overlap with one another since a different one of the reply blocks is preselected by the selection switches for the plurality of the terminals having the same address. The reply signal RS which is to be received by the host machine 3, is a series of the reply signal RS1 during the reply block B1, the reply signal RS2 during the reply blocks B2 and B3, the reply signal RS3 during the reply block B4 and the reply signal RS4 during the reply block B5. The host machine 3 fetches sequentially the reply signals RS serially sent and determines which of the terminals sent the reply signal in issue, depending upon the reply block. In other words, in the illustrated embodiment, the host machine 3 decides that the reply signal in issue during the reply block B1 is one including the monitor data I11 as sent from the terminal 51, the reply signals during the reply blocks B2 and B3 are ones including the monitor data I22 and I23 as sent from the terminal 52, the reply signal during the reply block B4 is one including the monitor data I34 as sent from the terminal 53 and the reply signal during the reply block B5 is one including the monitor data I45 as ent from the terminal 54. This enables the host machine 3 to monitor the terminals 51 to 54 when addressing the terminals once. It is further noted that the terminals 51 to 55 having the same address A, are placed under control of the transmission signal SS from the host machine 3 at one time.

Figure 6:
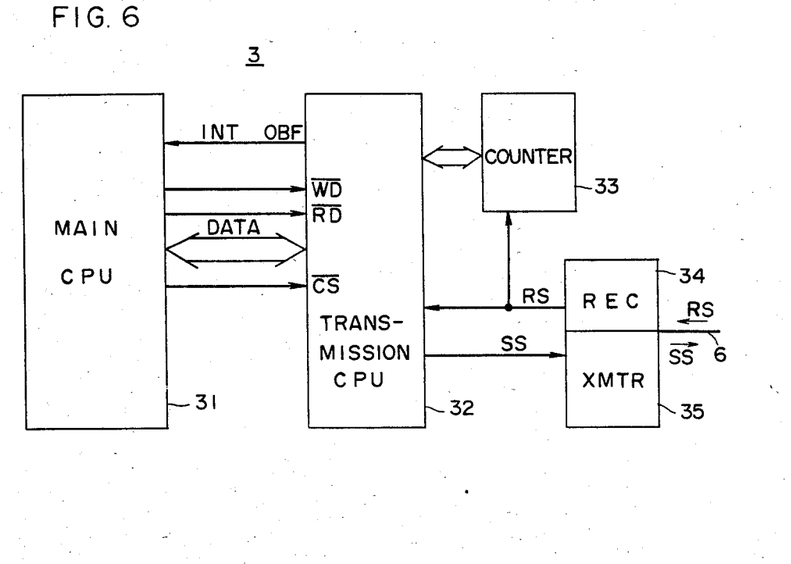
FIG. 6 is a block diagram of an example of a host machine used with the present invention.
Figure 7:
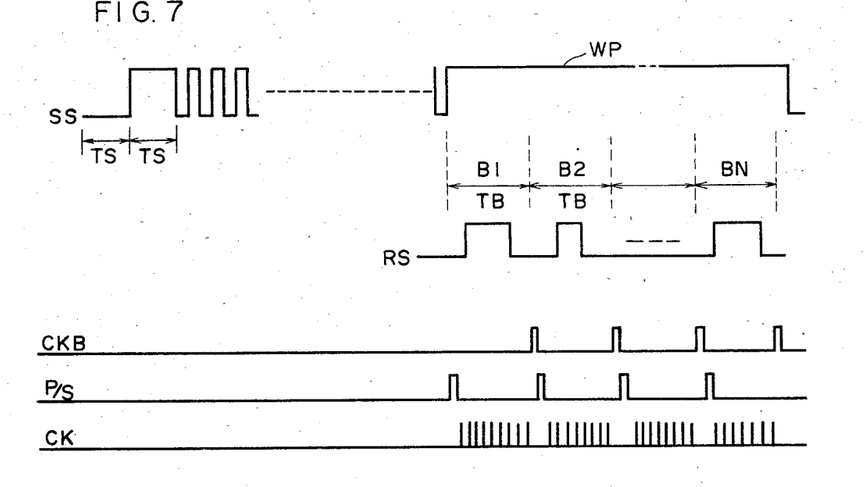
FIG. 7 includes graphs of signal waveforms for describing the operation of the embodiment of the present invention.
Figure 8:
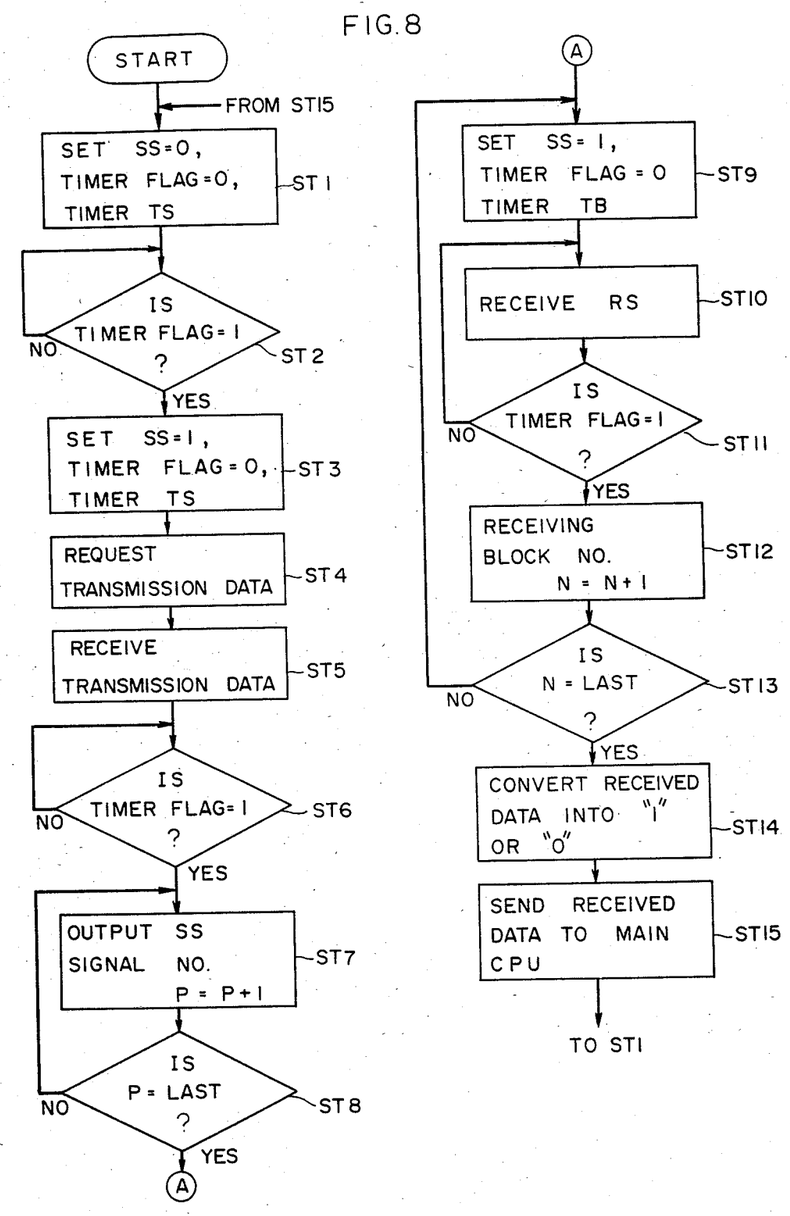
FIG. 8 is a flow chart for describing the operation of the host machine.

The host machine and the terminals in the embodiment of FIG. 4 will be discussed in further detail below. FIG. 6 is a block diagram of an example of the host machine 3 used with the present invention. A main CPU (central processing unit) 31 is connected to a transmission CPU 32 which in turn is connected to a receiver circuit 34 and a transmitter circuit 35. The above- mentioned signal line 6 is connected to the receiver circuit 34 and the transmitter circuit 35. Furthermore, a counter 33 is connected to the transmission CPU 32. The transmission CPU 32 has a built-in timer. Referring to FIGS. 7 and 8, the following will give a better understanding of the operation of the host machine 3 as shown in FIG. 6. FIG. 7 illustrates waveforms of signals for describing the operation of the above embodiment of the present invention. FIG. 8 is a flow chart for describing the operation of the host machine 3. The upper half of FIG. 7 depicts the transmission signal SS sent by the host machine 3 and the reply signals RS received by the host machine 3, while the lower half of FIG. 7 will be discussed later on. Referring to FIG. 8, in the step ST1, the transmission signal SS is made to be the logic value "0" in the transmission CPU 32, a timer flag is made to be "0" and the timer TS is set. In the step ST2, it is determined if the timer flag is "1". This is done in order to obtain the timer TS. If it is "1", then the program proceeds to the step ST3 in which the transmission signal SS is brought up to the logic value "1", the timer flag is made to be "0" and the timer TS is set. The transmission CPU 32 calls for the transmission data from the main CPU 31 in the step ST4 and receives the transmission data in the step ST5. In the step ST6, it is determined if the timer flag is "0" and, if it is "1", then the program proceeds to step ST7, in which the transmission signal SS including the address data AD and control data CD is sent from the transmission CPU 32 with one-by-one increment of the number P of the signal pulses. In the step ST8, it is decided whether the signal number P reaches its final value and, if affirmative, the program proceeds to the step ST9 in which the transmission signal SS is raised to the logic value "1", the timer flag is made to be "0" and the timer TB is set. In the step ST10, the reply signal RS is received. In the step ST11, it is decided whether the timer flag is "1" and, if it is "1", the program proceeds to the step ST12. In the step ST12, the number N of receiving blocks is incremented one by one. In the step ST13, it is determined if the number N reaches its maximum value and, if the maximum value is reached, the program advances to the step ST14. Otherwise, the program returns to the step ST9. The data received are converted to "1" or "0" in the step ST14 and sent to the main CPU 31 in the step ST15. Thereafter, the program returns to the step ST1. Through the foregoing steps, the host machine 3 sends out the transmission signal SS and receives the reply signals RS.

Figure 9:
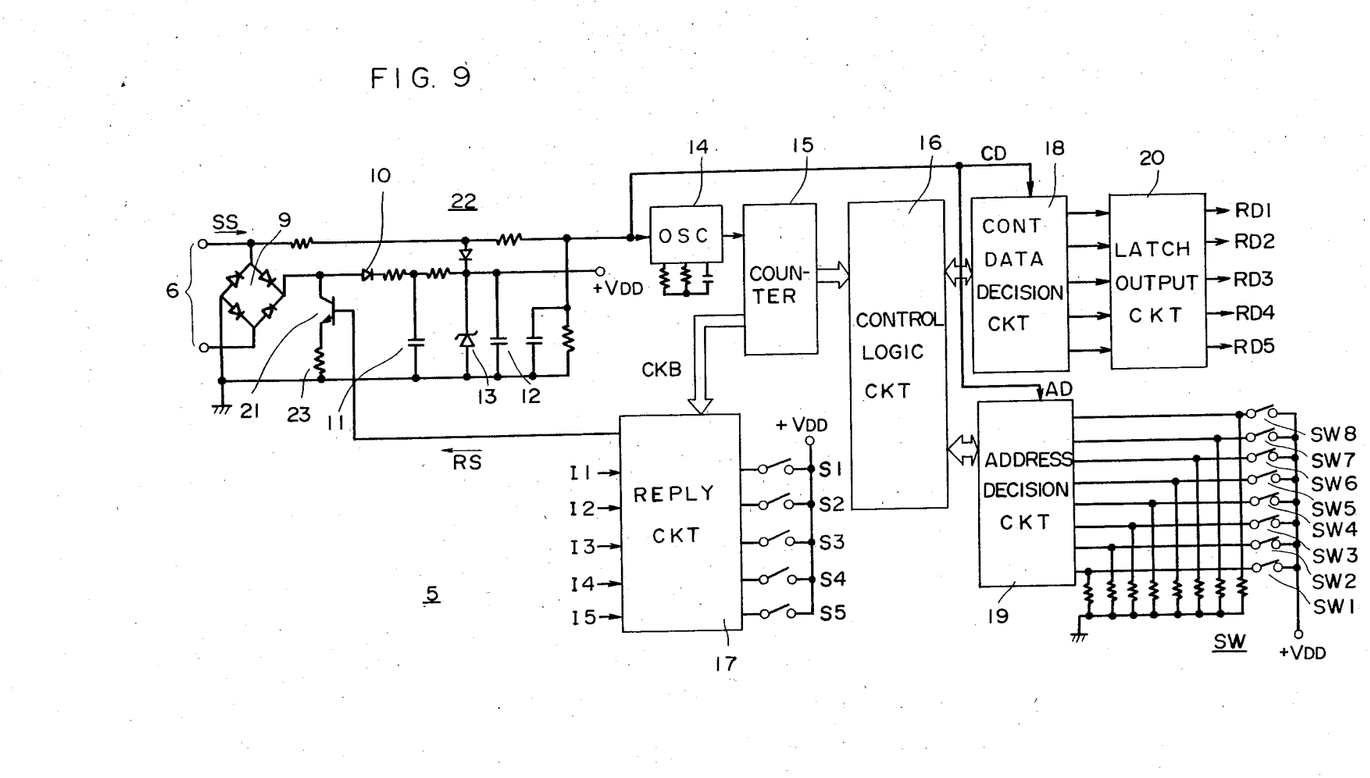
FIG. 9 is a circuit diagram of an embodiment of a terminal used with the present invention.

FIG. 9 is a circuit diagram of an example of the terminals used with the present invention. An interface circuit 22 is connected to the signal line 6 and an oscillator circuit 14, a reply circuit 17, a control data decision circuit 18 and an address decision circuit 19 are connected to the interface circuit 22. A counter 15 is connected to the oscillator circuit 14 and a control logic circuit 16 and the reply circuit 17 are connected to the counter 15. The control logic circuit 16 is connected to the control data decision circuit 18 and the address decision circuit 19. A latch output circuit 20 is connected to the control data decision circuit 18, while an address setting switch portion SW is connected to the address decision circuit 19. The interface circuit 22 provides a suitable interface between the terminal 5 and the host machine 3. The transmission signal SS fed via the signal line 6 from the host machine 3 is full-wave rectified through a diode bridge 9 and charged on smoothing capacitors 11 and 12 via reverse current blocking diode 10, thus providing a suitable control power supply $+V_{DD}$ for the terminal 5. The transmission signal SS is shaped through a zener diode 13 and fed to the oscillator circuit 14. The oscillator circuit 14 carries out self-oscillation with an input voltage of a high level and stops self-oscillation when that of a low level. The counter 15 counts output pulses from the oscillator circuit 14 and supplies timing signals including block-changing clock CKB and so forth to the control logic circuit 16 and the reply circuit 17. The control data decision circuit 18 fetches the control data CD out of the transmission signal SS under control of the control logic circuit 16. Furthermore, the address decision circuit fetches the address data AD out of the transmission signal SS under control of the control logic circuit 16. The latch output circuit 20 latches the output of the control data decision circuit 18 and supplies control signals RD1 to RD5. The address setting switch portion SW connected to the address decision circuit 19, includes address setting switches SW1 to SW8 to set up a unique address for the associated terminal 5. The address decision circuit 19 determines if the address, as identified by the address data AD included in the transmission signal SS, is in agreement with the address setting. If both agree, the address decision circuit 19 renders the control data decision circuit 18 operative by way of the control logic circuit 16. As a result, the control data decision circuit 8 fetches the control data CD following the address data AD out of the transmission signal SS, and supplies the control signals RD1 to RD5 via the latch output circuit. As stated previously, the control signals are fed from the plurality of the terminals having the same address setting. Selection switches S1 to S5 are connected to the reply circuit 17 and, when some of these selection switches are turned ON, the corresponding monitor data are sent as the reply signal RS from the reply circuit 17 during the corresponding reply blocks. When this occurs, the reply circuit 17 outputs a pulse of a broader width and a pulse of a narrower width when the monitor data bear the logic value "1" and the logic value "0", respectively. Provided however that some of the selection switches S1 to S5 are turned OFF, the reply circuit 17 outputs neither the wider pulse nor the narrower pulse during the corresponding reply blocks. An output section of the reply circuit 17 is led to the base of a transistor 21 in the interface circuit 22. If the reply signal RS goes up to a high level, then the transistor 21 is turned ON, so that the signal line 6 is made to be low impedance by way of the transistor 21 and a resistor 23, and the reply signal RS is sent back to the host machine in the current mode. In other words, the reply signals never overlap on the signal line 6 as long as different ones of the selection switches are placed ON for each of the terminals having the same address setting.

Figure 10:
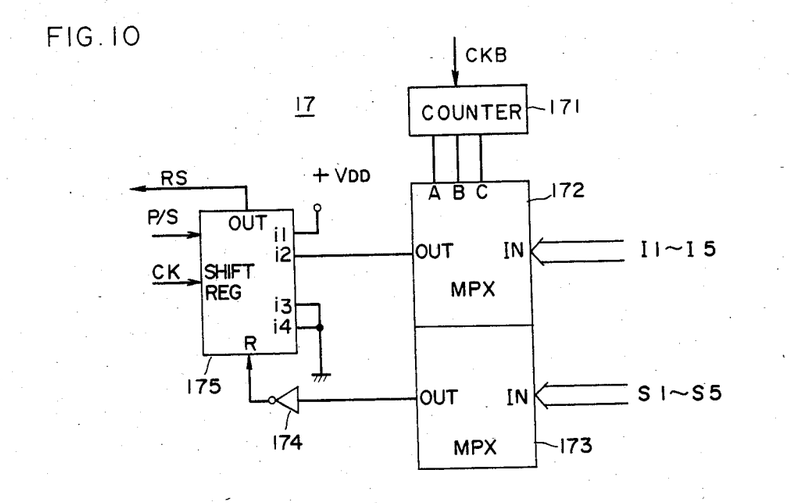
FIG. 10 is a block diagram of an embodiment of the reply circuit 17 of FIG. 9.
Figure 11:
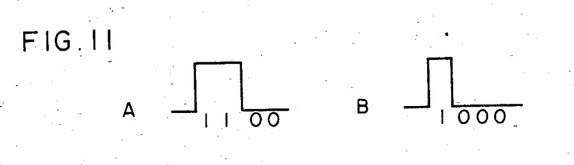
FIG. 11 includes graphs of reply signals fed from the shift register 175 of FIG. 10.

The following will go into further details of the reply circuit 17 as illustrated in FIG. 9. FIG. 10 is a block diagram of an example of the reply circuit 17 of FIG. 9. The reply circuit 17 comprises a counter 171 connected to the counter 15 of FIG. 9, multiplexers 172 and 173 connected to the counter 171 and a shift register 175 connected to the multiplexers 172 and 173. An input section IN of the multiplexer 172 is supplied in a parallel fashion with the monitor data I1 to I5, whereas an input section IN of the multiplexer 173 is supplied in a parallel fashion with electric representations of the states of the selection switches S1 to S5. The counter 71 is fed with the block-changing clock CKB, and the shift register 175 is fed with a parallel/serial selection clock P/S and a clock CK. The waveforms of these signals are depicted in the lower half of FIG. 7. The multiplexers 172 and 173 are responsive to the block-changing clock CKB for outputting the input data serially for each reply block. Assume now that only the selection switch S1 is ON, for example. An output section OUT of the multiplexer 173 provides a signal of the logic value "1" during the reply block B1. An inverter 174, therefore, provides a signal of the logic value "0" for a reset terminal R of the shift register 175. Under these circumstances, the shift register 175 is not reset. In the case where only the monitor data I1 of the monitordata I1 to I5, bears the logic value "1", an output section OUT of the multiplexer 172 provides a signal of the logic value "1" during the reply block B1 and feeds the same to an input portion i2 of the shift register 175. The shift register 175 delivers a signal of the logic value "1100" as the reply signal RS from its output section OUT. In this case, it is noted that the reply signal RS of the logic value "1100" corresponds to the wider pulse as seen in FIG. 11A. When the monitor data I1 bears the logic value "0", a signal of the logic value "0" is fed into the input portion i2 of the shift register 175 during the reply block B1. Thsignal which is delivered as the reply signal RS from the output section OUT of the shift register 175 becomes the logic value "1000". In this case, as seen in FIG. 11B, the reply signal RS corresponds to the narrower pulse. Since the selection switches S2 to S5 are OFF, the shift register 175 is reset during the reply blocks B2 to B5 so that no reply signal RS is supplied from the shift register 175.

Figure 12:
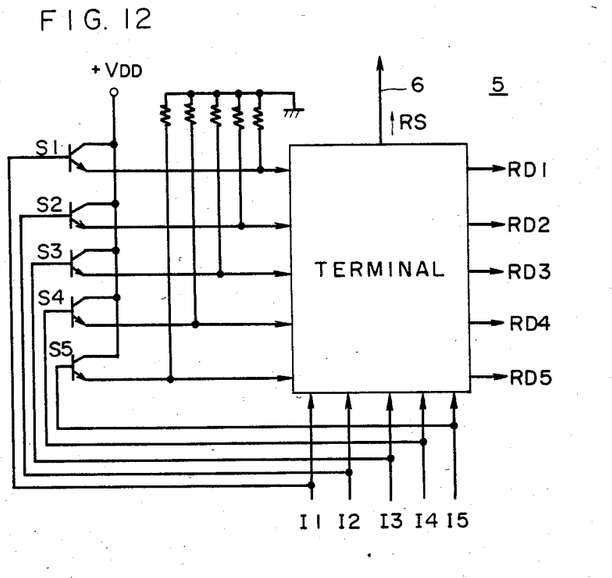
FIG. 12 is a circuit diagram of another embodiment of the terminal used with the present invention.

FIG. 12 illustrates another example of the terminal 5 according to the present invention. The selection switches S1 to S5 each comprise a transistor connected as an emitter follower. The base of each of the transistors is supplied with the monitor data I1 to I5, respectively. When the monitor data I1 to I5 all bear the logic value "0", the terminal 5 does not provide the reply signal RS for the signal line 6. If any of the monitor data I1 to I5 bears the logic value "1", the corresponding one of the selection switches S1 to S5 is turned ON so that the wider pulse (i.e., the logic value "1") is sent back during the corresponding reply block, and no reply signal is sent during the remaining reply blocks. The terminal 5 illustrated in FIG. 12 is very effective especially when monitoring objects having exactly the same function are installed at a number of sites. For example, in the case where terminals 5 having the same address, are installed for each room of a hotel or the like, an input section for the monitor data I1 is connected to flame alarms in the respective rooms, an input section for the monitor data I2 is connected to gas leakage alarms in the respective rooms, the counterpart for the monitor data I3 is connected to electricity leakage alarms in the respective rooms and the counterpart for the monitor data I4 is connected to emergency alarm switches in the respective rooms. With such an arrangement, while no reply signal RS is sent from any of the terminals 5 in the absence of an abnormal condition, the monitor data I1 becomes the logic value "1" and the reply signal RS is fed during the first reply block if a fire breaks out, for example. Therefore, provided that the objects to be monitored in the respective rooms are connected to the terminals 5 in the rooms, the host machine 3 can monitor the objects to be monitored merely by addressing the terminals once. With the terminals 5 as shown in FIG. 12, it is not necessary to preset the selection switches for each of the terminals. This is because only the monitor data having the logic value "1" are returned to the host machine 3 during the corresponding reply blocks.

Figure 13:
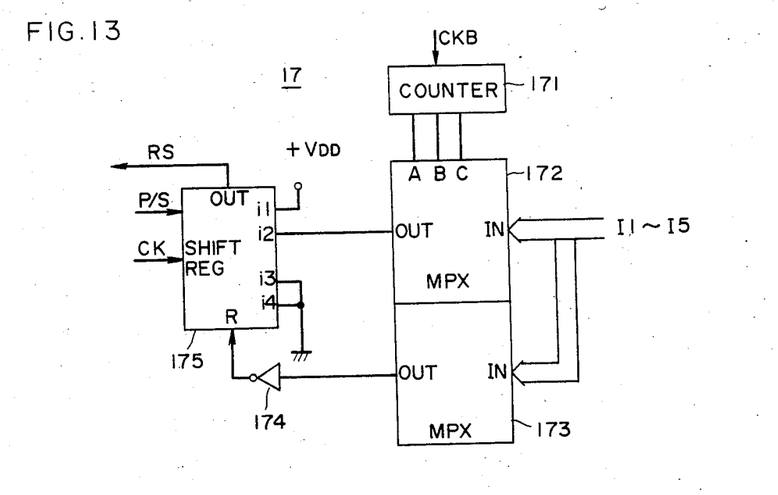
FIG. 13 is a block diagram of another embodiment of the reply circuit 17of FIG. 9.

Another example of the reply circuit 17 for use in the terminal 5 of FIG. 12 will be shown. FIG. 13 is a block diagram of an alternative embodiment of the reply circuit 17. Only the difference between this embodiment and the reply circuit 17 of FIG. 10 will be discussed. The monitor data I1 to I5 are fed in parallel to the input sections IN of the multiplexers 172 and 173. When the monitor data I1 to I5 all bear the logic value "0", the shift register 175 is reset during all of the reply blocks with no development of the reply signal RS therefrom. However, if any of the monitor data I1 to I5 is assumed to be the logic value "1", then the shift register 175 provides the reply signal RS of the logic value "1" during the corresponding one of the reply blocks.

Figure 14:
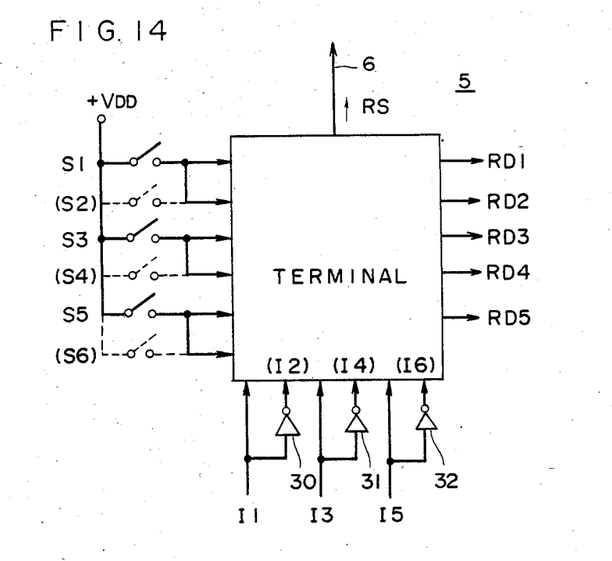
FIG. 14 is a circuit diagram of still another embodiment of the terminal according to the present invention.
Figure 15:
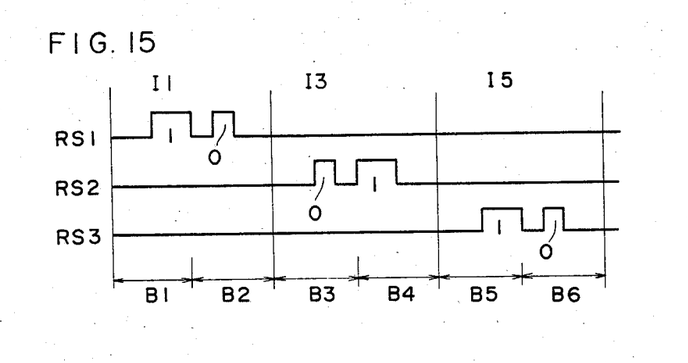
FIG. 15 is a time chart for describing the operation of the terminal illustrated in FIG. 14.

Still another embodiment of the terminal 5 according to the present invention is depicted in FIG. 14. In this embodiment, the monitor data I2, I4 and I6 out of the monitor data I1 to I6 supplied to the terminals 5 are the complements of the monitor data I1, I3 and I5 as available from inverters 30 to 32. The selection switches S2, S4 and S6 are eliminated and their functions are carried out by the selection switches S1, S3 and S5. FIG. 15 is a time chart for describing the operation of the terminal illustrated in FIG. 14. For example, assume that three terminals 5, as shown in FIG. 14, are connected to the signal line 6 and the same address is assigned to the three terminals. The selection switch S1 is turned ON in the first terminal, the selection switch S3 is turned ON in the second terminal and the selection switch S5 is turned ON in the third terminal. If the monitor data I1, I3 and I5 have the logic values "1", "0" and "1", respectively, the reply signal RS1 sent from the first terminal to the host machine, bears "10" during the reply blocks B1 and B2, the reply signal RS2 sent from the second terminal, bears "01" during the reply blocks B3 and B4 and the reply signal RS3 from the third terminal bears "10" during the reply blocks B5 and B6. There is, therefore, no overlap in timing of the reply signals from the respective terminals. The host machine 3 evaluates the sum of the logic values during the reply blocks B1 and B2, the sum of the logic values during the reply blocks B3 and B4 and the sum of the logic values during the reply blocks B5 and B6. If each of the sums is an odd number, then the host machine receives as effective monitor data the logic values during the reply blocks B1, B3 and B5. On the other hand, if any of the sums is an even number, then the host machine requests the terminals to send the reply signals again. This function reduces transmission errors to a minimum.

Figure 16:
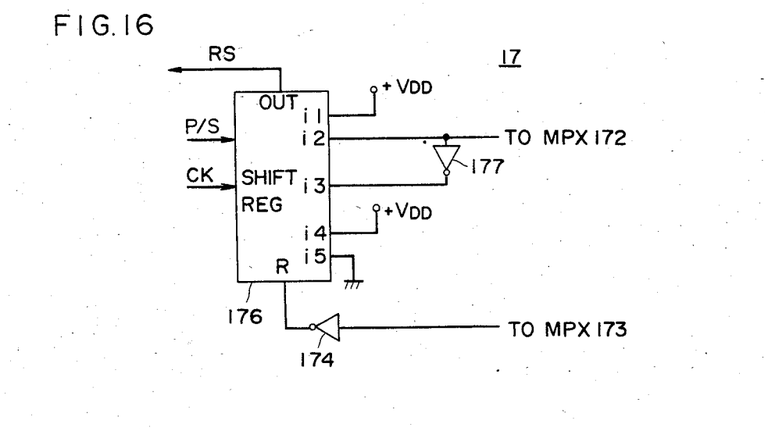
FIG. 16 is a block diagram of still another embodiment of the reply circuit 17 of FIG. 9.
Figure 17:
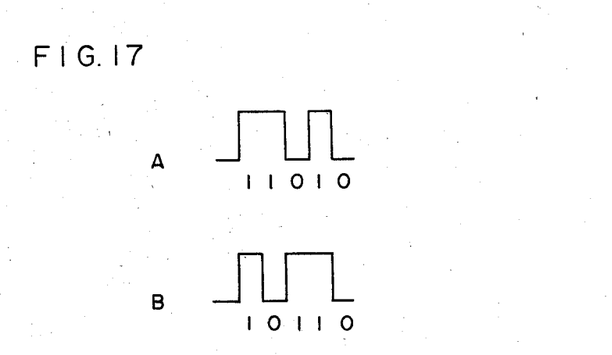
FIG. 17 includes graphs of reply signals from the shift register 176 of FIG. 16.

An example of the reply circuit 17 capable of generating the reply signals illustrated in FIG. 15 will be explained. FIG. 16 illustrates in a block diagram such an embodiment of the reply circuit 17. The following will discuss only the distinction of this example from the reply circuits 17 as shown in FIGS. 10 and 13. An input portion i2 of a shift register 176 is connected to the output section OUT of the multiplexer 172 which is shown in FIGS. 10 and 13. An input section of the inverter 174 is connected to the output section OUT of the multiplexer 173 which is shown in FIGS. 10 and 13. The input portion i2 of the shift register 176 is further connected to an input portion i3 via an inverter 177. When a signal from the multiplexer 172 bears the logic value "1", an output section OUT of the shift register 176 provides signals "11010" as the reply signal RS. The waveform of the resulting signals is depicted in FIG. 17A. On the other hand, when the signal from the multiplexer 172 bears the logic value "0", the reply signal fed from the shift register 176 is "10110". The resulting signal is shown in FIG. 17B.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A time-division multiplex transmission system comprising:
   a host machine;
   a signal line connected to said host machine; and
   a plurality of addressable terminals connected to objects to be controlled and objects to be monitored, and connected to said host machine by way of said signal line to place the objects to be controlled under centralized control of said host machine and to place the object to be monitored under centralized monitoring of said host machine, said host machine including:
   transmission means for transmitting, in a cyclic fashion, a transmission signal including address data for addressing said terminals, control data for controlling the objects to be controlled and reply standby signals for defining a reply standby period during which reply signals, including monitor data, may be received from any of said terminals, the reply standby period being divided into a number of reply blocks; and
   first reception means for receiving the reply signals from any of said terminals during the reply standby period and for picking up the monitor data included therein,
   each of said plurality of terminals including:
   second reception means for receiving the transmission signal transmitted fron said transmission means of said host machine;
   address setting means for setting, as a preset address, an address assigned to the terminal, the same address being set for a number of said terminals which is less than the number of the reply blocks;
   address decision means, connected to said second reception means and said address setting means, for determining if the address defined by the address data in the received transmission signal corresponds to the present address;
   control signal output means, connected to said second reception means and said address decision means, for providing a control signal corresponding to the control data when said address decision means determines that correspondence exists between the addresses;
   reply means for receiving from the objects to be monitored a number of monitor data signals, including monitor data, which is less than the number of reply blocks, and for supplying, for at least one preselected reply block, the reply signal including the monitor data; and
   selection means, connected to said reply means, for selecting the at least one preselected reply block for which the reply signal is to be supplied by said reply means, a different one of the reply blocks being preselected for each of said plurality of terminals having the same preset address, by means of said selection means in each of said terminals, a particular object to be monitored being connected to a particular terminal out of said plurality of terminals having the same address, so that the monitor data in the monitor data signal from the particular object can be determined.

2. A time-division multiplex transmission system according to claim 1, wherein said reply means provides the reply signal as a pair including the monitor data and its logic value inverse.

3. A time-division multiplex transmission system according to claim 1 wherein:
   said reply means comprises:
   a counter, connectd to said second reception means, for specifying one of the reply blocks;
   a first multiplexer having an output section and connected to said counter and connected to be supplied in a parallel fashion with the monitor data; and
   a shift register, connected to said output section of said first multiplexer, for providing the reply signal; and
   said selection means comprises:
   switch means for selecting the preselected reply block during which the reply signal is to be sent from said reply means, so that a different one of the reply blocks is preselected for each of said plurality of terminals having the same preset address; and a second multiplexer, connected to said counter, said switch means and said shift register, for resetting said shift register when the specified reply block is other than the preselected supply block for the corresponding one of said terminals.

4. A time-division multiplex transmission system according to claim 3, wherein said shift register provides the reply signal as a pair including the monitor data and its logic value inverse.

5. A time-division multiplex transmission system comprising:

a host machine;

a signal line connected to said host machine; and a plurality of addressable terminals connected to objects to be controlled and objects to be monitored, and connected to said host machine by way of said signal line to place the objects to be controlled under centralized control of said host machine and to place the objects to be monitored under centralized monitoring of said host machine, said host machine including:

transmission means for transmitting, in a cyclic fashion, a transmission signal including address data for addressing said terminals, control data for controlling the objects to be controlled and reply standby signals for defining a reply standby period during which reply signals, including monitor data, may be received from any of said terminals, the reply standby period being divided into a number of reply blocks; and first reception means for receiving the reply signals from any of said terminals during the reply standby period and for picking up the monitor data included therein, each of said plurality of terminals including:

second reception means for receiving the transmission signal transmitted from said transmission means of said host machine;

address setting means for setting, as a preset address, an address assigned to the terminal, the same address being set for a number of said terminals which is less than the number of the reply blocks;

address decision means, connected to said second reception means and said address setting means, for determining if the address defined by the address data in the received transmission signal corresponds to the preset address;

control signal output means, connected to said second reception means and said address decision means, for providing a control signal corresponding to the control data when said address decision means determines that correspondence exists between the addresses;

reply means for receiving from the objects to be monitored a number of monitor data signals, including monitor data, which is less than the number of the reply blocks, and for supplying, for at least one preselected reply block, the reply signal including the monitor data; and selection means, connected to said reply means, for selecting the at least one preselected reply block for which the reply signal is to be supplied by said reply means, said selection means also being supplied with the monitor data signals, said selection means selecting the reply block corresponding to one of the monitor data signals having a logic value of "1".

6. A time-division multiplex transmission system according to claim 5, wherein said reply means provides the reply signal as a pair including the monitor data and its logic value inverse.

7. A time-division multiplex transmission system according to claim 5, wherein:

said reply means comprises:

a counter, connected to said second reception means, for specifying one of the reply blocks;

a first multiplexer having an output section and connected to said counter and connected to be supplied in a parallel fashion with the monitor data; and a shift register, connected to said output section of said first multiplexer, for providing the reply signal; and said selection means comprises:

a second multiplexer, connected to said counter and said shift register, and connected to be supplied in a parallel fashion with the monitor data, for resetting said shift register during the specified reply block when the monitor data having a logic value of "1" are not supplied.

8. A time division multiplex transmission system according to claim 7, wherein said shift register provides the reply signal as a pair including the monitor data and its logic value inverse.

* * * * *

UNITED STATES PATENT AND TRADEMARK OFFICE
CERTIFICATE OF CORRECTION

PATENT NO. : 4,604,618
DATED : AUGUST 5, 1986
INVENTOR(S) : OSAMU AKIBA ET AL.

It is certified that error appears in the above-identified patent and that said Letters Patent is hereby corrected as shown below:

```
Col. 2, line 7, "R" should be --RS--;
        line 39, "terminal)under" should be --terminal)
                    under--.

Col. 4, line 10, "17of" should be --17 of--;
        line 65, "on" should be --ON--.

Col. 5, line 28, "55" should be --54--.

Col. 7, line 37, "71" should be --171--.

Col. 9, line 61, "object" should be --objects--.

Col. 10, line 54, "1" should be --1,--;
         line 56, "connectd" should be --connected--.
```

Signed and Sealed this

Fourth Day of November, 1986

[SEAL]

*Attest:*

DONALD J. QUIGG

*Attesting Officer*     *Commissioner of Patents and Trademarks*